(12) United States Patent
Evans et al.

(10) Patent No.: US 7,690,723 B2
(45) Date of Patent: Apr. 6, 2010

(54) VEHICLE SEAT SIDE AIR BAG

(75) Inventors: Nancy C. Evans, Clinton Township, MI (US); Scott D. Thomas, Novi, MI (US); William A. Biondo, Beverly Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/416,977

(22) Filed: Apr. 2, 2009

(65) Prior Publication Data
US 2009/0315305 A1 Dec. 24, 2009

Related U.S. Application Data

(63) Continuation-in-part of application No. 12/144,712, filed on Jun. 24, 2008.

(51) Int. Cl.
*B60R 21/00* (2006.01)
*B60R 21/20* (2006.01)
(52) U.S. Cl. ............................... 297/216.13; 280/728.3
(58) Field of Classification Search ............ 297/216.13, 297/216.1; 280/728.1, 730.2, 728.2, 728.3
See application file for complete search history.

(56) References Cited

U.S. PATENT DOCUMENTS

| | | | | | |
|---|---|---|---|---|---|
| 5,967,603 | A | * | 10/1999 | Genders et al. | 297/216.13 |
| 6,003,938 | A | * | 12/1999 | Lachat et al. | 297/216.13 |
| 6,302,431 | B1 | * | 10/2001 | Sasaki et al. | 280/728.2 |
| 6,352,304 | B1 | * | 3/2002 | Sorgenfrei | 297/216.13 |

* cited by examiner

*Primary Examiner*—Milton Nelson, Jr.

(57) ABSTRACT

A vehicle seat includes a seat back frame, a cushion, and an air bag assembly mounted upon the frame within a hollow provided in the cushion. A trim cover includes a side panel facing the side of the vehicle and a front panel facing forwardly, the side panel and front panel being joined to one another at a vertical extending seam. The side panel also has a lower horizontal extending separable seam, an upper horizontal extending separable seam, and a forward vertical seam that may or may not be sewn to the front panel. On inflation of the air bag, the inflating air bag forces the side panel outwardly causing separation of the separable seams and inflate forwardly, upwardly and downwardly through separable seams of the side panel. In addition, a rear vertical extending seam can be provided that would extend between the upper and lower horizontal extending separable seam.

20 Claims, 16 Drawing Sheets

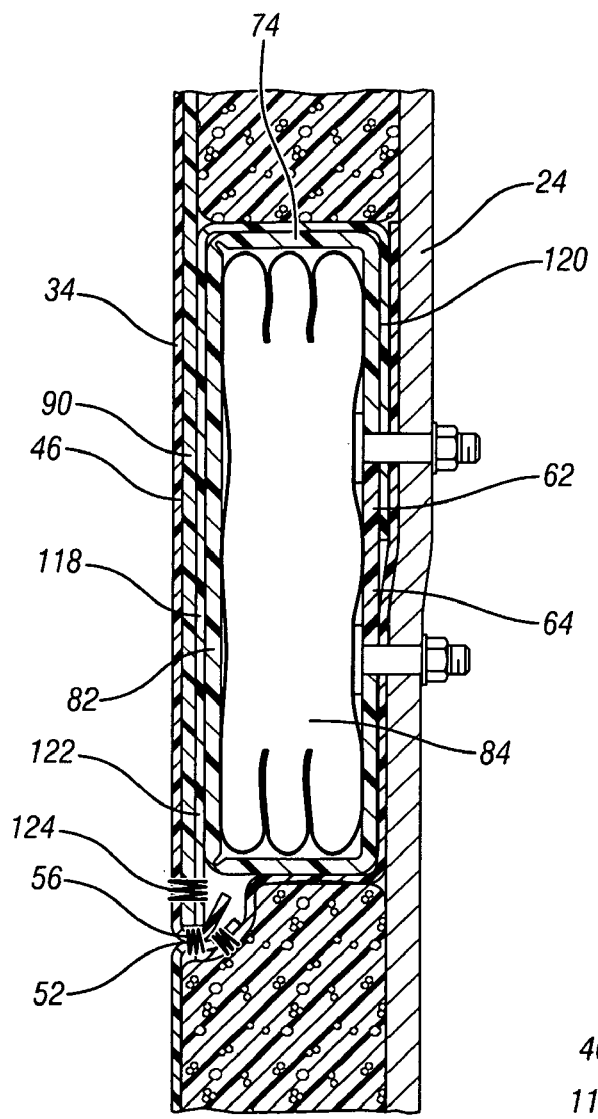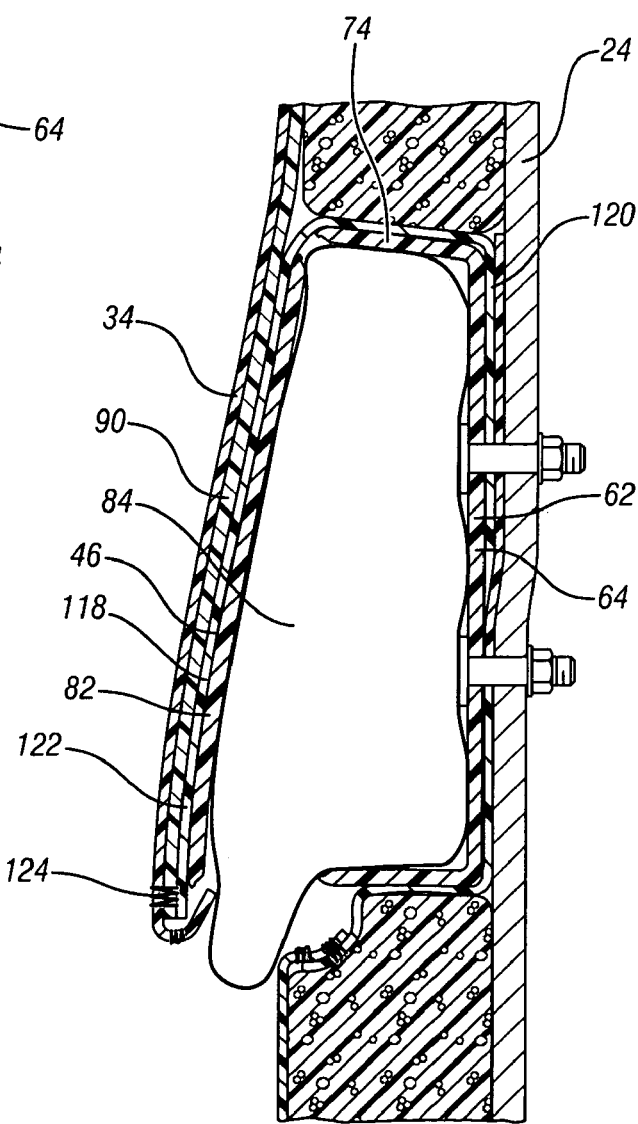
FIG. 7
FIG. 8

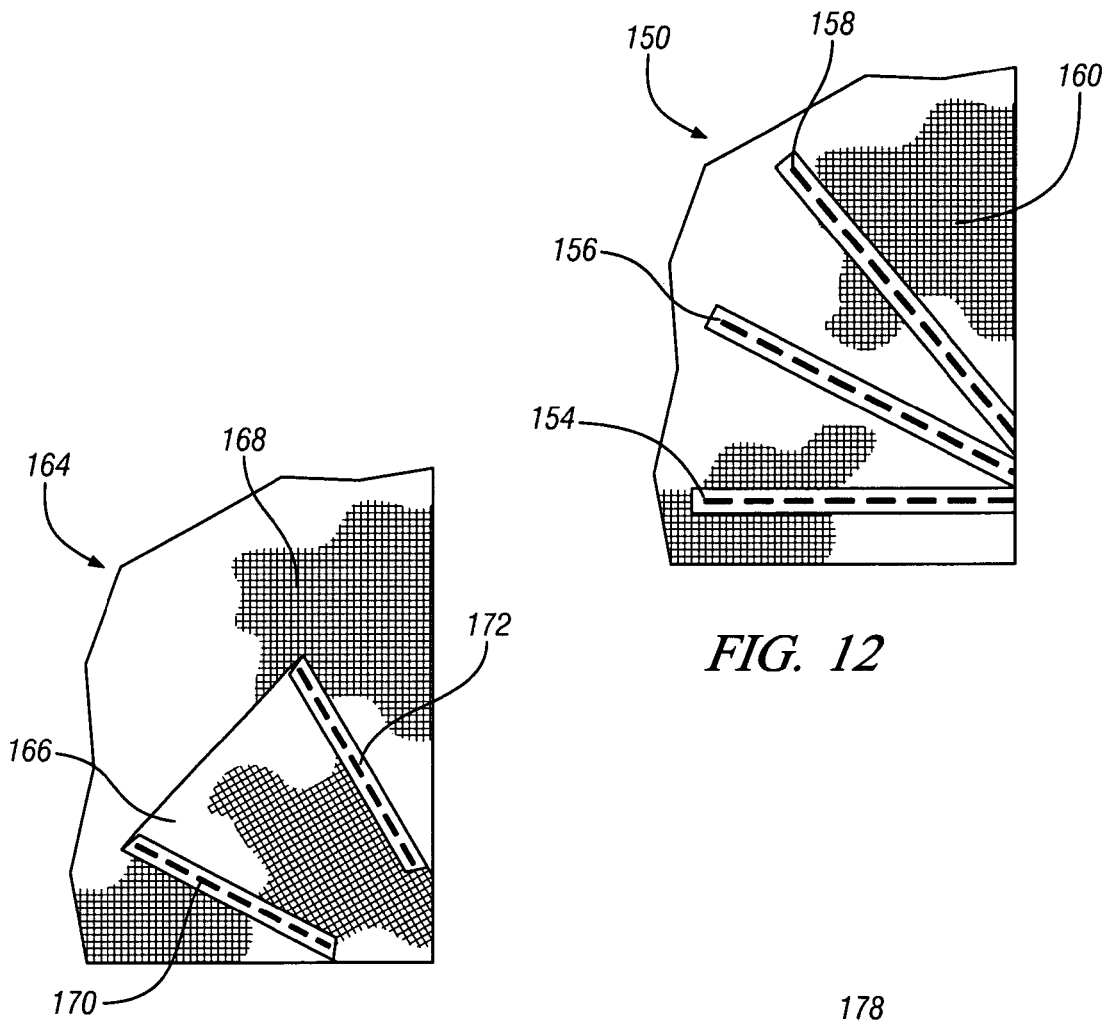
FIG. 12
FIG. 13
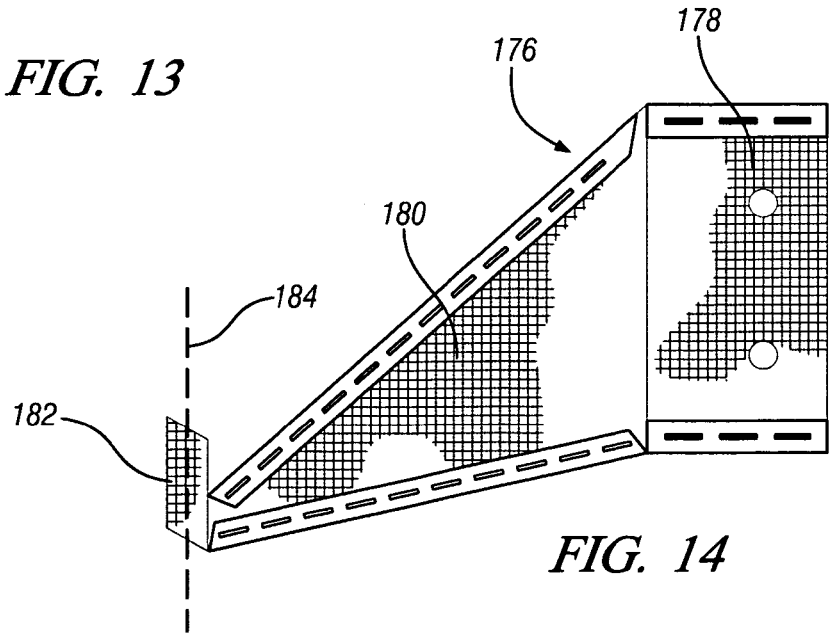
FIG. 14

VEHICLE SEAT SIDE AIR BAG

This application is a Continuation-In-Part of U.S. Ser. No. 12/144,712, filed Jun. 24, 2008, and entitled "Vehicle Seat Side Air Bag".

FIELD OF THE INVENTION

The present invention relates to a vehicle seat having a side impact air bag and more particularly to an air bag and seat combination that facilitates the inflation and deployment of the air bag through separable seams provided in the seat cover.

BACKGROUND OF THE INVENTION

It is well known in the automotive industry to provide a vehicle seat having an air bag mounted on the outboard side of the seat back to provide side impact restraint of a seated occupant. The air bag may include a thorax portion that inflates forwardly of the occupant torso, a head portion that inflates more upwardly and forwardly to restrain the occupant head, and a pelvis portion that inflates more downwardly and forwardly to restrain the occupant pelvis. The air bag is folded up and stored within an air bag housing that is mounted on the seat back. In some cases, a plastic door conceals the folded up air bag and then the door opens to permit the deployment of the air bag forwardly and downwardly. However, it is generally considered to be more aesthetically acceptable to hide the air bag assembly within the seat back beneath the traditional seat cover and to provide the seat trim cover with separable seams that can break apart to permit the air bag to deploy forwardly and downwardly.

It would be desirable to provide an improved vehicle seat with side air bag that would assure the prompt and efficient inflation of the air bag from the seat back to optimize restraint of the occupant.

SUMMARY OF THE INVENTION

A vehicle seat with air bag includes a seat back frame, a foam seat back cushion mounted on the seat back frame, and an air bag assembly mounted upon the frame within a hollow provided in the cushion. A trim cover covers the cushion and conceals the air bag assembly. The trim cover includes a side panel facing the side of the vehicle and a front panel facing forwardly, the side panel and front panel being joined to one another at a vertical extending seam. The side panel also has a lower portion and an intermediate portion that join one another at a lower horizontal extending separable seam and an upper portion that joins the intermediate portion at an upper horizontal extending separable seam. The intermediate portion also has a forward separable seam either attached to the forward intermediate side panel portion or the forward panel. On inflation of the air bag, the inflating air bag forces the side panel outwardly causing separation of the separable seams and enabling the air bag to inflate forwardly through the vertical extending separable seam between the side panel and the front panel of the seat cover and simultaneously to inflate upwardly and downwardly through the upper and lower horizontal extending separable seams of the side panel. In addition, a rear vertical extending seam can be proved extending between the upper and lower horizontal extending separable seam.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 is a section view similar to the section view of FIG. 3 but showing another embodiment of the invention.

FIG. 8 shows the air bag of FIG. 7 being inflated.

FIG. 12 is a side view showing stiffeners provided on the air bag chute.

FIG. 13 is another embodiment of stiffeners for the air bag chute.

FIG. 14 is another stiffener for the air bag chute.

DETAILED DESCRIPTION OF THE EXEMPLARY EMBODIMENTS

The following description of certain exemplary embodiments is merely exemplary in nature and is not intended to limit the invention, its application, or uses.

Figure 1:
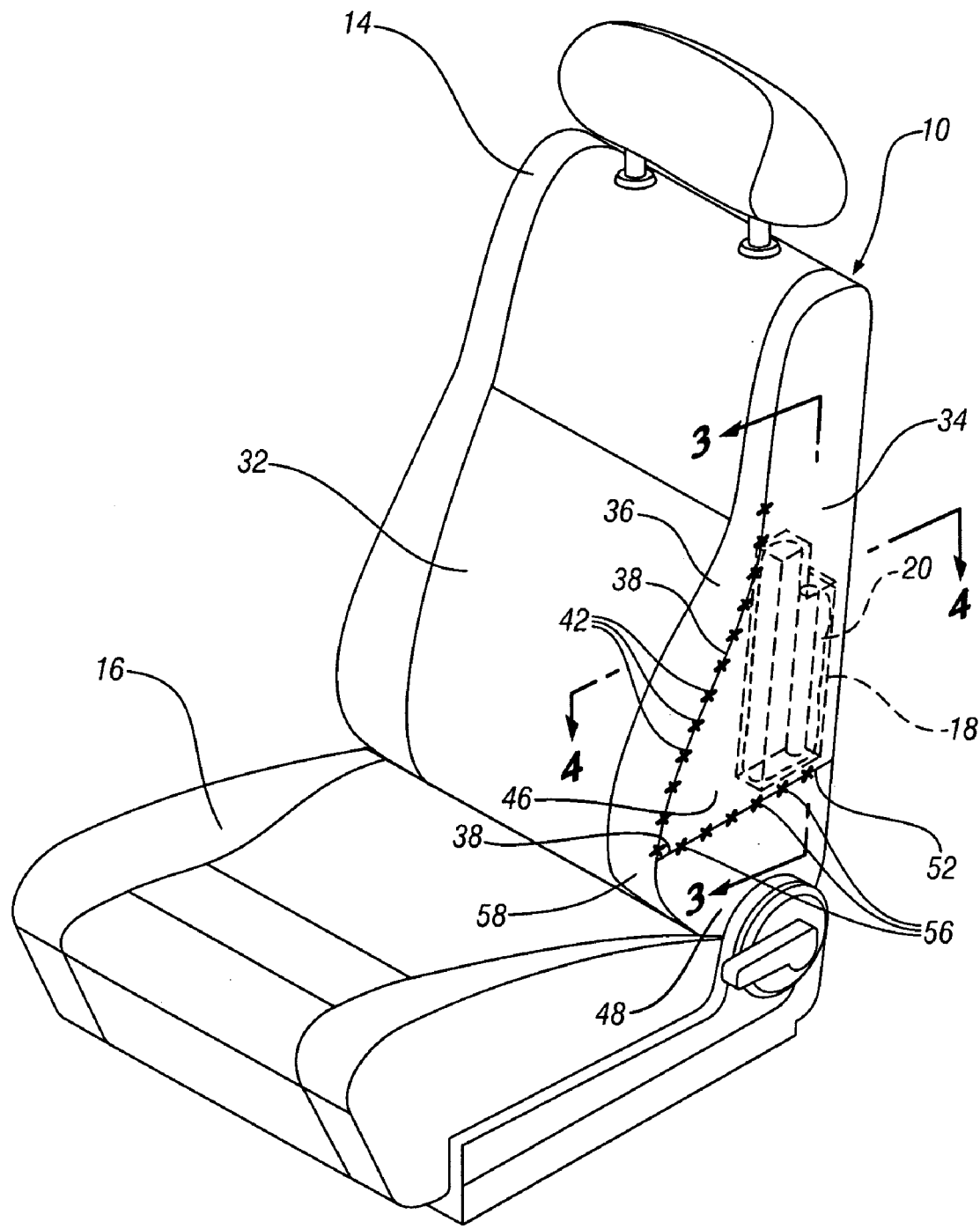
FIG. 1 is a perspective view of a vehicle seat having a side air bag.
Figure 3:
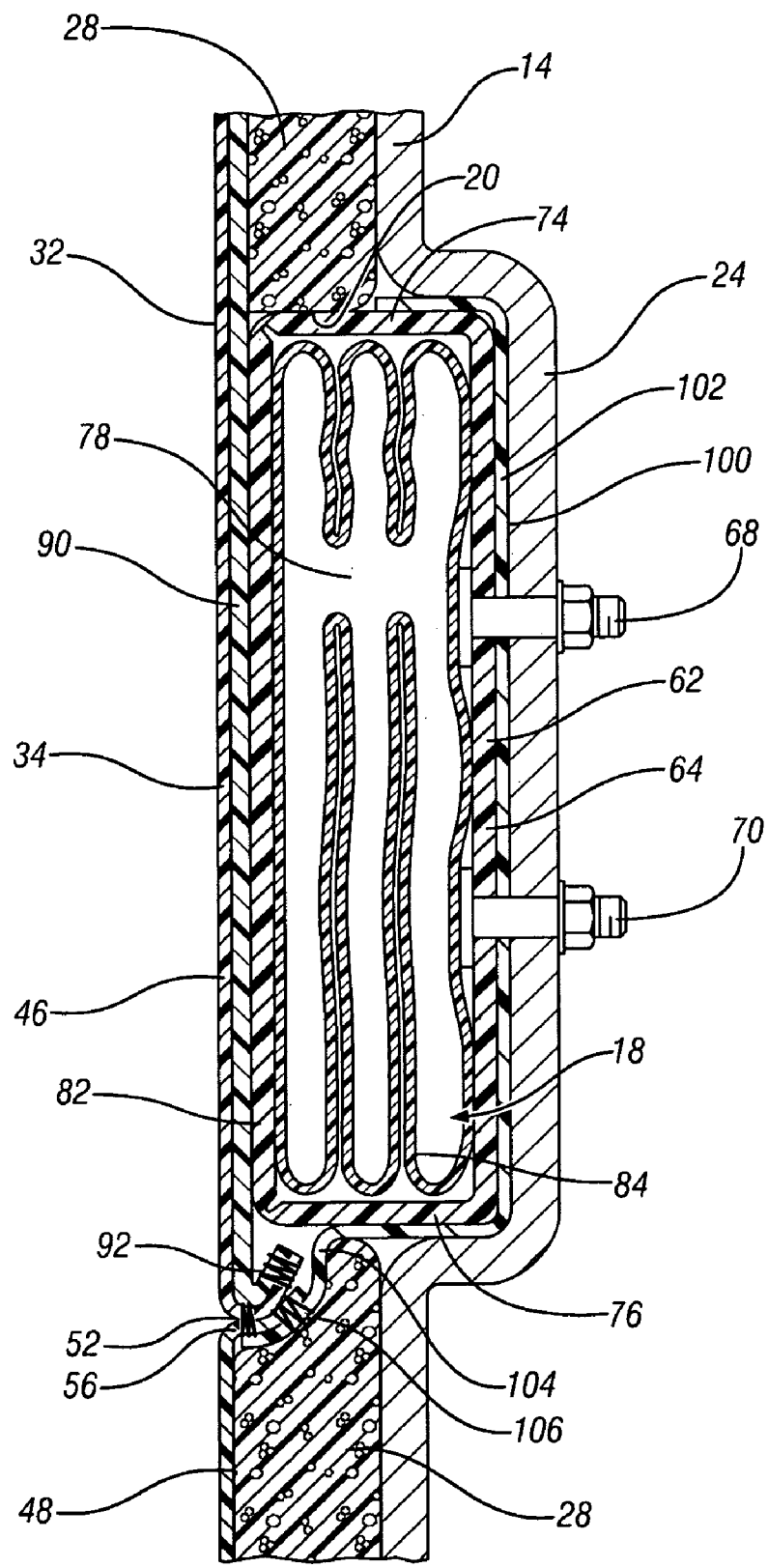
FIG. 3 is a section view taken in the direction of arrows 3-3 of FIG. 1.
Figure 4:
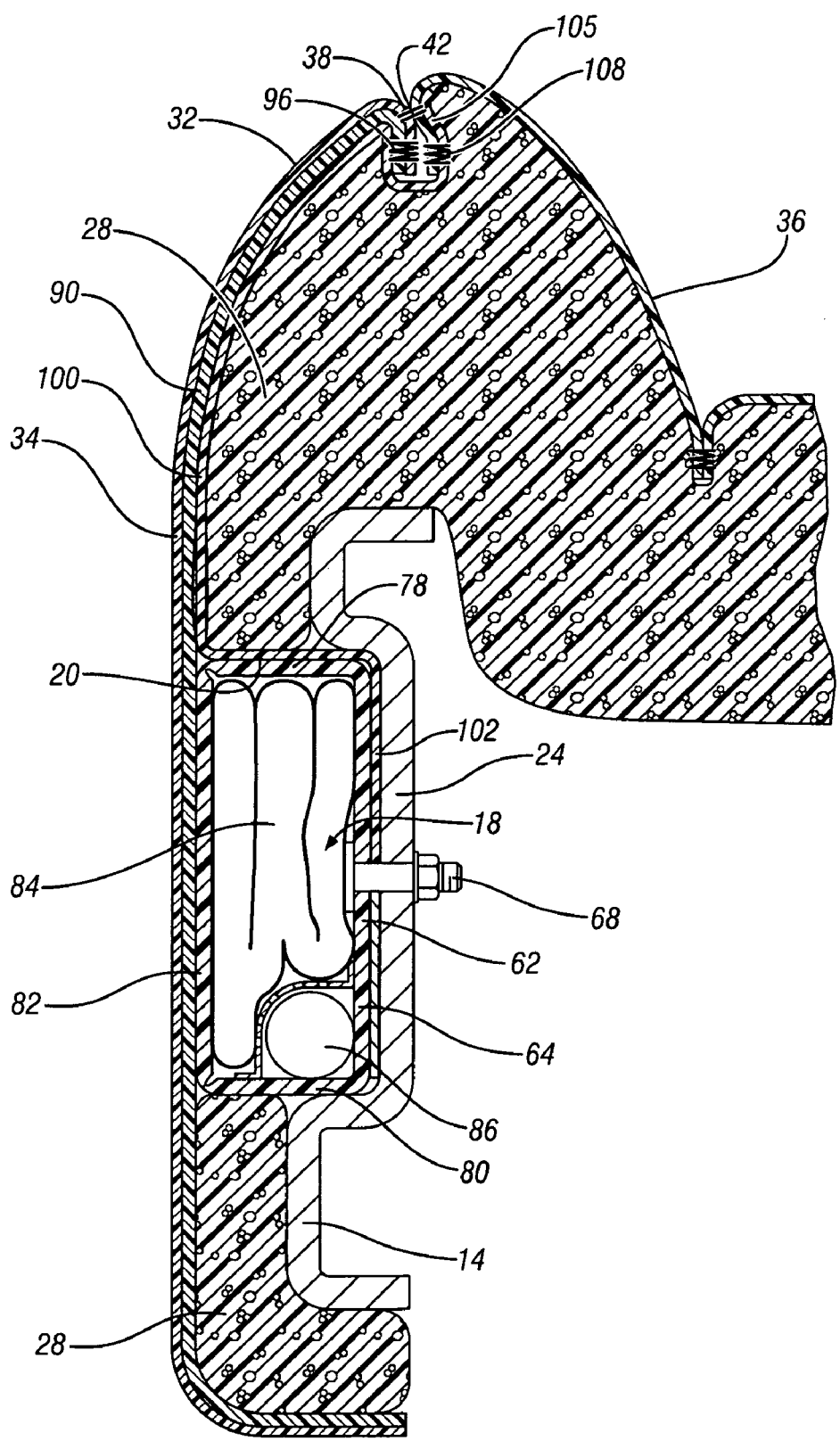
FIG. 4 is a section view taken in the direction of arrows 4-4 of FIG. 1.

Referring to FIGS. 1, 3 and 4, a vehicle seat generally indicated at 10 includes a seat back 14 and a seat bottom 16. An air bag assembly, generally indicated at 18, is mounted within a hollow 20 in the seat back 14. As seen in FIGS. 3 and 4, the seat back 14 includes a seat frame 24 of stamped metal construction. A foam seat cushion 28 covers the frame 24 and is suitably attached thereto. The foam cushion 28 is concealed beneath a seat trim cover 32, such as a woven cloth, vinyl, or leather.

As best seen in FIG. 4, the trim cover 32 includes a side panel 34 and a front panel 36. The side panel 34 and the front panel 36 are joined together at a vertical extending separable seam 38 that is formed by a series of breakaway stitches 42 that will be overcome upon inflation of the air bag as will be described hereinafter. Referring to FIGS. 1 and 3, the side panel 34 includes an upper portion 46 and a lower portion 48 that are joined together at a horizontal extending separable tear seam 52 provided by a series of breakaway stitches 56 that are provided between the lower edge of the upper portion 46 and the upper edge of the lower portion 48. Referring again to FIG. 1, it is seen that the breakaway stitches 42 forming the vertical extending tear seam 38 and the breakaway stitches 56 forming the horizontal extending tear seam 52 intersect with one another at tear seam intersection 58 so that the overall shape of the separable seams 38 and 52 is an L-shaped geometric arrangement adjacent the air bag assembly 18 on the outboard side of the seat back 14.

Referring to FIGS. 3 and 4, it is seen that the air bag assembly 18 includes an air bag housing 62 having a base wall 64 that is attached to the seat frame 24 by bolts 68 and 70. The housing 62 has side walls including upper side wall 74, lower side wall 76, front side wall 78 and rear side wall 80. The side walls 74, 76, 78 and 80 are connected by a breakaway cover 82 that conceals a folded up air bag 84 and an inflator 86. The air bag housing is conventionally constructed of plastic or fabric or a combination of plastic and fabric.

Referring to FIG. 3, it is seen that the side panel 34 of the seat cover is lined with an outer chute 90 that has a lower end sewed to the lower end of the side panel 34 by stitches at 92. And, as seen in FIG. 4, the outer chute 90 also has a forward end which is sewn to the forward end of the side panel 34 adjacent to the separable seam 38 by stitches 96. The outer chute 90 is of a material that is less stretchable than the trim cover 32 material of the side panel 34 and has a smooth surface finish to allow the low friction passage of the air bag 84 there against.

FIGS. 3 and 4 also show an inner chute 100 that has a base portion 102 that is captured between the base wall 64 of the air bag housing 62 and the seat frame 24 to fixedly anchor the inner chute 100. As seen in FIG. 3, the inner chute 100 includes a lower edge portion 104 that extends downwardly and is sewn to the lower portion 48 of the side panel 34 by stitches at 106. FIG. 4 shows that the inner chute 100 extends forwardly between the foam cushion 28 and the side panel 34 all the way forward to the separable seam 38 where the forwardmost end 105 of the inner chute 100 is sewn to the front panel 36 of the seat cover by stitches 108. The inner chute 100 is made of a material that is less stretchable than the foam cushion 28 and offers a smooth low friction surface to allow the low friction passage of the air bag 84 there against.

Figure 2:
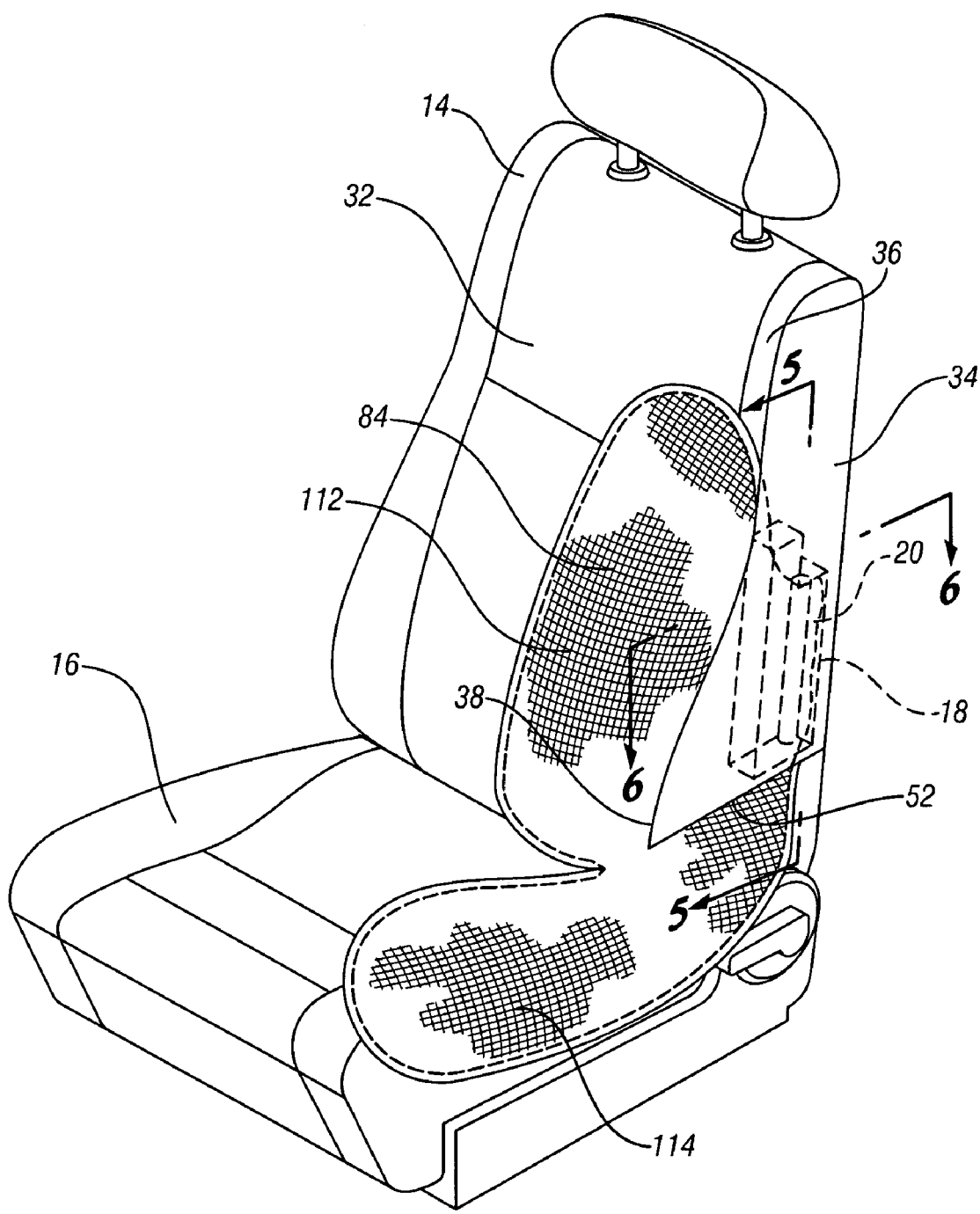
FIG. 2 is a view similar to FIG. 1 but showing the air bag to have been inflated and deployed as permitted by separation of separable seams of the seat trim cover.
Figure 5:
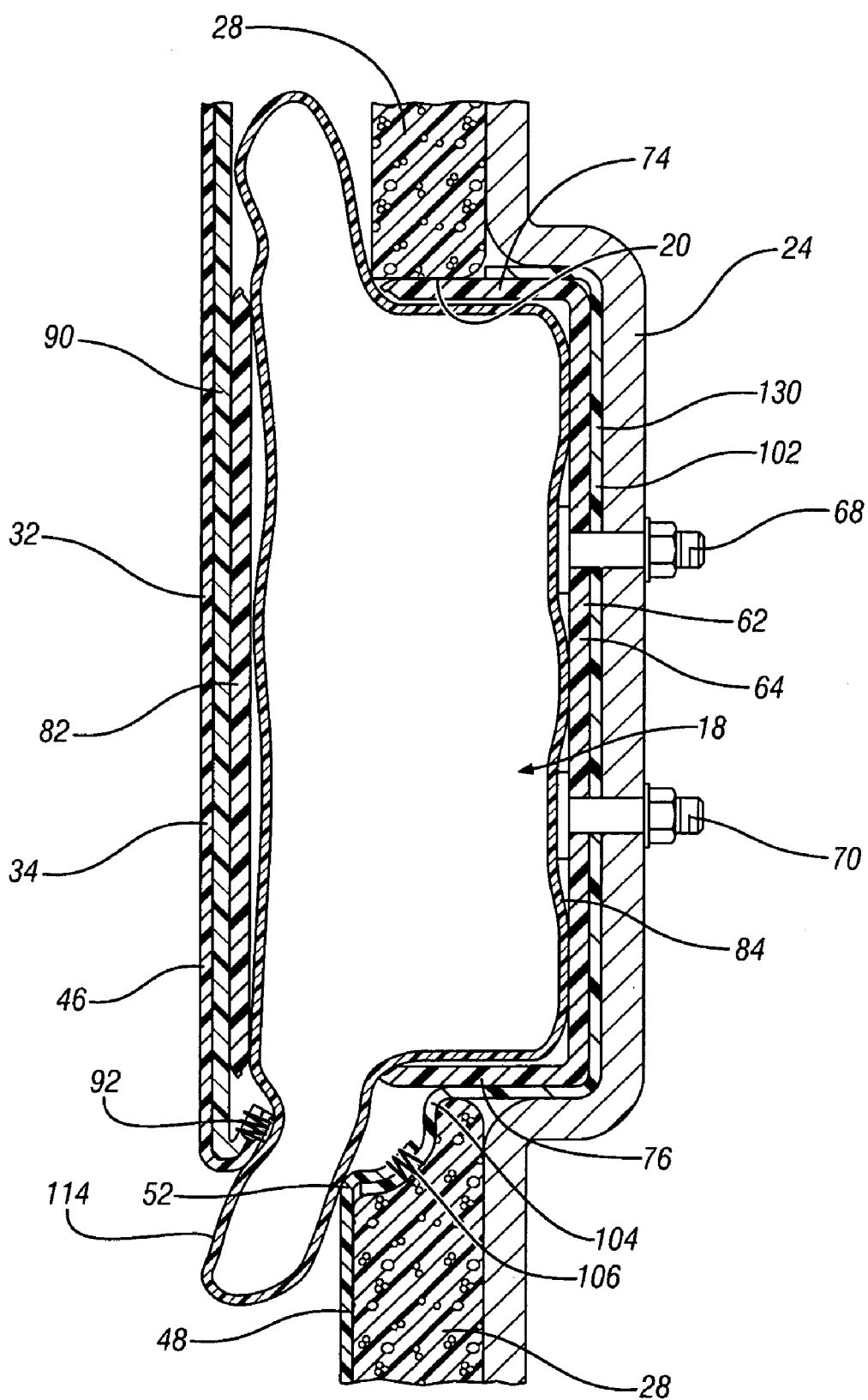
FIG. 5 is a view similar to FIG. 3 but showing the air bag being inflated and causing a separation of the horizontal extending separable seam.
Figure 6:
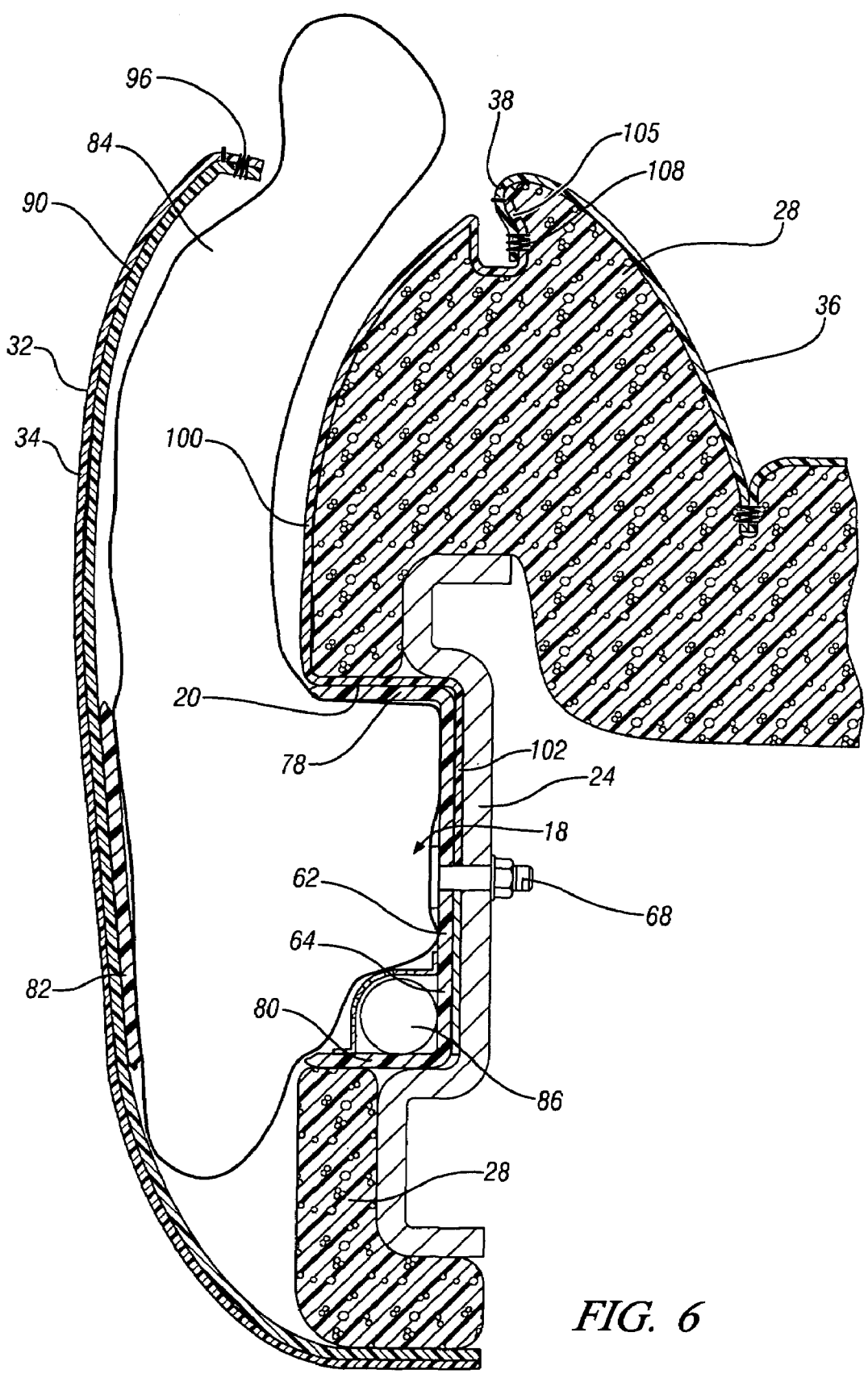
FIG. 6 is a section view similar to FIG. 4 but showing the air bag being inflated and causing separation of the vertical extending separable seam.

FIGS. 2, 5 and 6 show the inflation of the air bag assembly 18. In particular, FIG. 2 shows that the air bag 84 includes an upper thorax portion 112 and a lower pelvis portion 114. In FIG. 5, it is seen that upon activation of the inflator 86, the air bag 84, including both its upper thorax portion 112 and the lower pelvis portion 114, has begun to inflate outwardly of the air bag housing 62 as permitted by break away of the breakaway cover 82. As seen in FIG. 5, the horizontally extending separable seam 52 at the lower edge of the air bag housing 62 has been separated, by the breaking of the stitches 56 to permit the emergence of the lower pelvis portion 114, and, as shown in FIG. 6, the emergence of the upper thorax portion 112 has likewise caused the opening of the vertical extending separable seam 38 via the breaking of the breakaway stitches 42 at the juncture between the side panel 34 and the front panel 36. It will be understood that during the inflation of the air bag 84, the outer chute 100 will function to prevent stretching of the side panel 34 so that the force of the air bag 84 acting upon the outer chute 90 will be transmitted effectively to the break away stitches 42 and 56. Likewise, the inner chute 100 will function in a similar manner to effectively anchor and restrain both the lower portion of the side panel 34 and the front panel 36 so that the force generated by the inflating air bag 84 is effectively focused at the breakaway stitches 42 and 56. Thus as seen in FIG. 2, the vertical extending separable seam 38 and the horizontal extending separable seam 52, will enable the inflating air bag to efficiently break out of its stored and hidden position of FIG. 1 to expedite its arrival at the fully inflated occupant restraining positions of FIG. 2.

FIGS. 7 and 8 show another embodiment of the invention in which an initiator band 118 is added to the structure shown in FIG. 5. In particular, FIG. 7 shows that the initiator band 118 has a base portion 120 that is anchored between the base wall 64 of air bag housing 62 and frame 24. The initiator band 118 reaches over the upper side wall 74 of the air bag housing 62 and extends downwardly between the breakaway cover 82 and the outer chute 90. The lowermost end 122 of the initiator band 118 is attached by stitches 124 to the lowermost ends of the upper portion 46 of the side panel 34 and to the lowermost end of the chute 90. Accordingly, upon activation of the air bag inflator 86, and inflation of the air bag 84, the initiator band 118 is tensioned and thrust leftwardly as viewed in FIG. 8 by the opening of the breakaway cover 82. Accordingly, the initiator band 118 will function to transmit and focus force directly to the breakaway stitches 56 of the horizontal extending separable seam 52 to facilitate the rapid deployment of the air bag 84. The initiator band 118 will be sized and oriented to tune the air bag deployment. For example, the initiator band 118 can be sized to have dimensions so that it substantially overlies the dimensions of the breakaway cover 82, or the initiator band 118 can be either larger than or smaller than the breakaway cover 82. The initiator band 118 can be one or more individual straps of an inch wide, and can be oriented to angle out diagonally toward the intersection 58 of the vertical extending separable seam 38 and the horizontal extending separable seam 52 of FIG. 1. The initiator band 118 can alternatively be sewn directly into the separable seam 52 so that the load applied to the initiator band 118 during deployment will be directly transmitted into the separable seam 52. In addition, the initiator band 118 can wrap around the rear wall 80 of the air bag housing 62 and extend to be sewn into or near to the vertical extending separable seam 38 so that the vertically separable seam 38 is also tensioned by the initiator band 118 during deployment.

Figure 9:
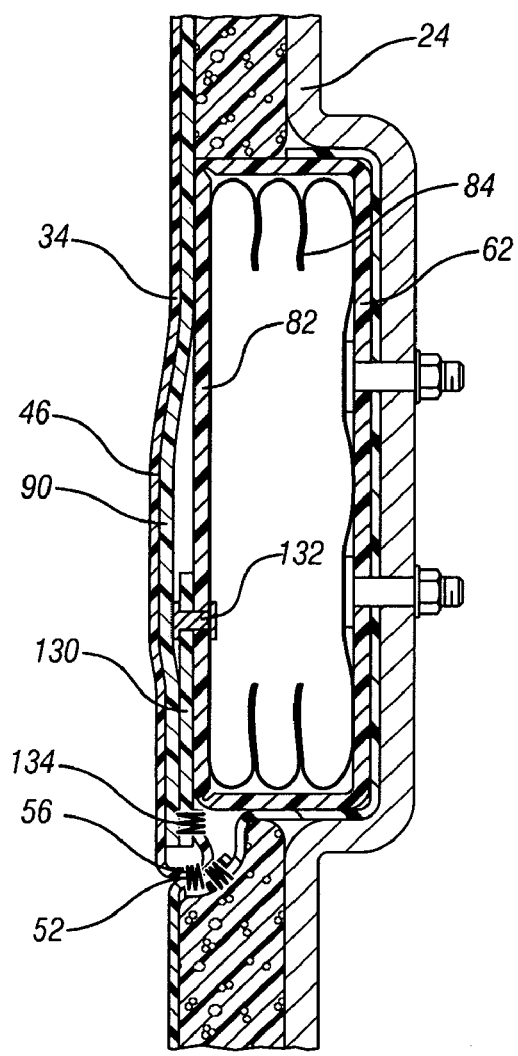
FIG. 9 is another section view similar to FIGS. 3 and 7 and 8 but showing another embodiment of the invention.

FIG. 9 shows another embodiment of the invention in which an initiator band 130 is added to the structure shown in FIG. 5. In particular, FIG. 9 shows that the initiator band 130 is a piece of plastic or fabric attached to the breakaway cover 82 by a rivet 132, or other mechanical attachment. The lowermost end of the initiator band 130 is attached by stitches 134 to the lowermost ends of the upper portion 46 of the side panel 34 and to the lowermost end of the outer chute 90. Accordingly, upon activation of the air bag inflator 86, and inflation of the air bag 84, the initiator band 130 is tensioned by the opening of the breakaway cover 82 and will function to transmit and focus force directly to the breakaway stitches 56 of the horizontal extending separable seam 52 to facilitate the rapid deployment of the air bag 84. The initiator band 130 can be sized and oriented to tune the air bag deployment. For example, the initiator band 130 can be sized to have dimensions so that it substantially overlies the dimension of the breakaway cover 82, or the initiator band 130 can be either larger or smaller than the breakaway cover 82. For example, the initiator band 130 can one or more individual straps of an inch wide, and can be oriented to angle out diagonally toward the intersection 58 of the vertical extending separable seam 38 and the horizontal extending separable seam 52 of FIG. 1. The initiator band 130 can alternatively be sewn directly into the separable seam 52 so that the load applied to the initiator band 130 during deployment will be directly transmitted into the separable seam 52. In addition, the initiator band 130 can wrap around the rear wall 80 of the air bag housing 62 and extend to be sewn into or near to the vertical extending separable seam 38 so that the vertically separable seam 38 is also tensioned by the initiator band 130 during the deployment.

Figure 10:
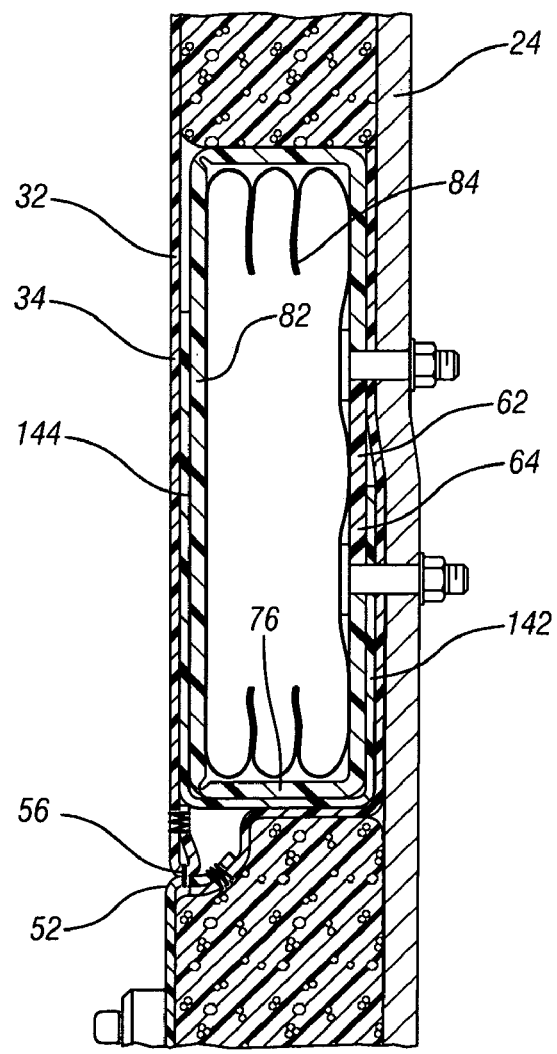
FIG. 10 is another section view similar to FIGS. 3, 7, 8 and 9, and showing yet another embodiment of the invention.
Figure 11:
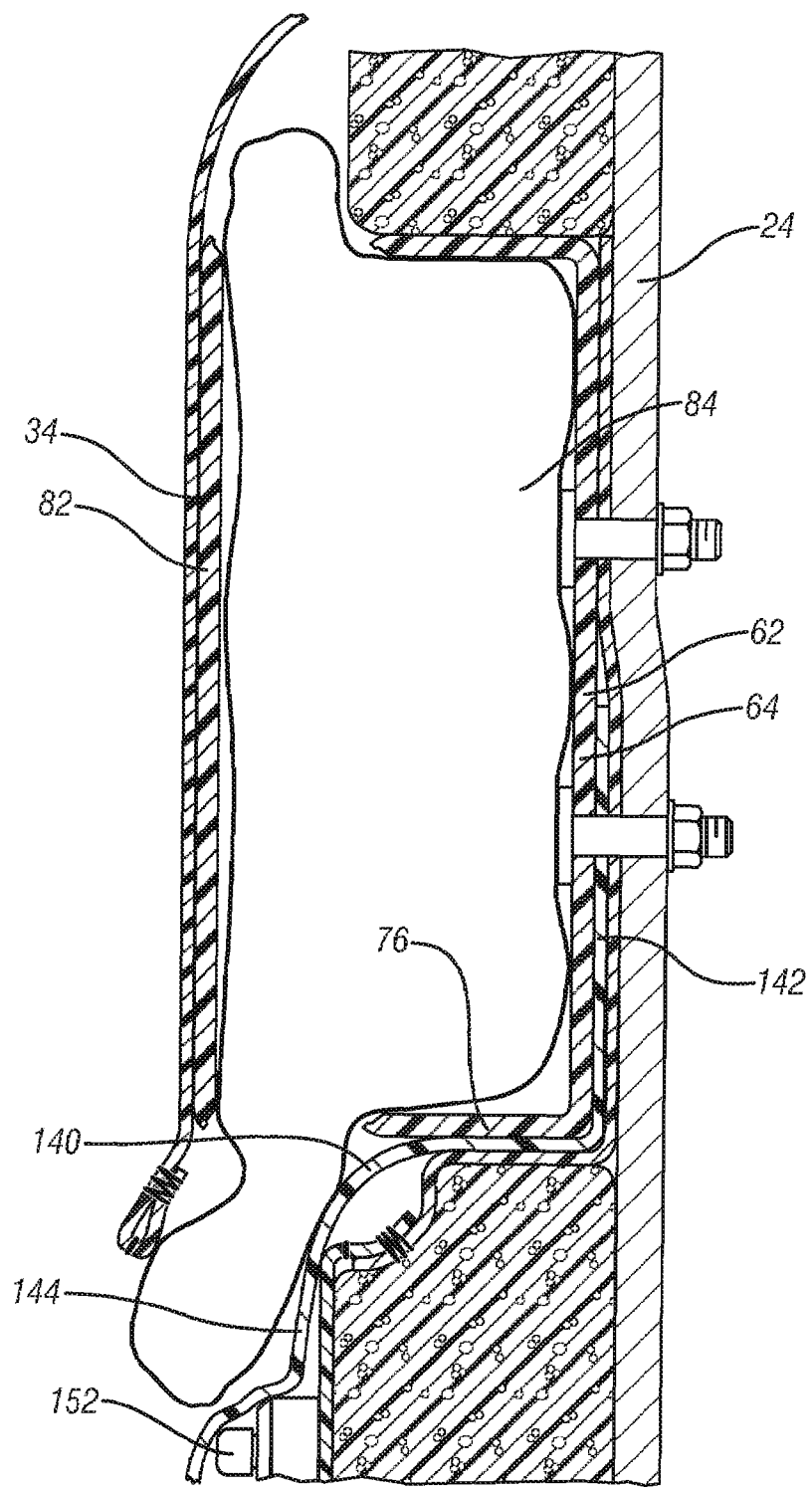
FIG. 11 is a section view corresponding to FIG. 10 and showing the air bag of FIG. 10 being inflated.

FIGS. 10 and 11 show another embodiment of the invention in which an initiator band or flap 140 is added to the structure shown in FIG. 5. In particular, FIG. 10 shows that the initiator band 140 is a piece of plastic or fabric having a base portion 142 that is anchored between base wall 64 of air bag housing 62 and the frame 24. The initiator band 140 reaches under the lower side wall 76 of the air bag housing 62 and has a tongue portion 144 that extends upwardly between the breakaway cover 82 and the side panel 34. Accordingly, upon activation of the air bag inflator 86, and inflation of the air bag 84, the initiator band 140 will be pressured by the force of the air bag and opening of the breakaway cover 82 and will thereby function to transmit and focus force away from the breakaway stitches 56 of the horizontal extending separable seam 52 under the initiator band 140 to facilitate rapid breakage away from the tear seam portion adjacent to the initiator band 140. As seen in FIG. 11, the tongue portion 144 of the initiator band 140 will lie down upon and cover a seat recliner handle 152 or other structure that might otherwise be contacted by the deploying air bag 84. Thus the initiator band 140 of FIGS. 10 and 11 functions to both focus the force on the tear stitches and to also cover the seat recliner handle. The initiator band 140 can be sized and oriented to tune the air bag deployment. For example, the initiator band 140 can be the sized to have dimensions so that it substantially overlies the dimension of the breakaway cover 82, or the initiator band 140 can be either larger of smaller than the breakaway cover 82. In addition, the initiator band 140 can be sized and position to also extend to the region of the vertical extending tear seam 38.

FIGS. 12 and 13 show different examples of stiffening structures that can be added to either or both of the outer chute 90 or the inner chute 100 to direct the air bag deployment force into the regions of the separable seams in order to optimize the breakout of the air bag 84. In FIG. 12, the stiffening structure, generally indicated at 150, includes three separate strips 154, 156, and 158 of fabric or plastic that is sewn or otherwise attached to the sheet 160 of the chute material. These stiffeners will reinforce the chute against stretching, and thereby focus the transmission of force to assist in breaking the breakaway stitches of the separable seams at selected localized regions. Furthermore, by proper selection of the length, location, and angle of orientation of the strips, the deployment can be further varied and tuned as desired.

In FIG. 13, the stiffening structure, generally indicated at 164, includes a piece 166 of fabric or plastic that has turned over edges 170 and 172 that are sewn or otherwise attached to the sheet 168 of the chute material. This stiffening structure 164 in effect doubles and triples the thickness of the chute, in selected areas, to limit the stretching of the chute and thereby focus the transmission of force to assist in breaking the breakaway stitches of the separable seams at selected localized regions. Furthermore, by proper selection of the length, size, location, number, thickness and angle of orientation of the stiffener 164 the deployment can be further varied and tuned as desired.

FIG. 14, shows another variant of an initiating band, generally indicated at 176 and including a base portion 178 that will be anchored adjacent the base wall 64 of the of the air bag housing 62, and a generally triangle shaped wall 180 having an end flap 182 that is adapted to be sewn directly into the breakaway threads of the separable seam that is represented by reference numeral 184. The edges of the triangle shaped walls may be sewn to the chute, or not, as desired. Thus, the band 176 will reinforce the chute against stretching, and, furthermore, by its connection directly into the breakaway threads, assist in breading the breakaway stitches of the separable seams. The tip of the initiator band 176 is folded over and places tension transmitted by the initiator band on the lower stitch of the breakaway threads, thereby focusing force on this stitch to enable rapid fracture. Furthermore, by proper selection of the length, location, and angle of orientation of the strips, the deployment can be further varied and tuned as desired.

It will be understood that the drawings herein show just one example of the implementation of the invention, and that various variations can be made within the scope thereof. For example, the drawings herein show a separable seam provided by a series of breakaway thread attaching together adjacent seat trim cover panels; however, the invention herein can be used in conjunction with the alternative types of separable seams known in the industry. The separable seam can be formed by Velcro, snap attachments, interlocking hooks, or other separable structures know to be useful for attaching together adjacent trim cover panel portions. The separable seam can be integral to the trim cover, for example, a line of weakened material or slotted material. The separable seams may be continuous or discontinuous. The rearward and forward ends of the outer chute 90 may continue rearward and be attached to the seat structure, be sewn into the side panel 34, wrap around the air bag housing 62 and be anchored adjacent the air bag housing 62, or attached to the seat foam 28. Also, the vertical separable seam 38 can also be located completely within the side panel 34, so that the materials on both sides of the seam are side panel material.

Although the drawing FIGS. 1 and 4 show the vertically extending separable seam 38 as located on that part of the seat back that faces forward toward the front of the vehicle, it will be understood that the juncture of the side panel 34 and the front panel 36 can be positioned more to the side of the seat to face more toward the side of the vehicle. In addition, the side panel 34 can have its upper portion 46 made of trim cover material, typically fabric, leather or vinyl, and the lower portion 48 made of a more rigid molded plastic.

Figure 15:
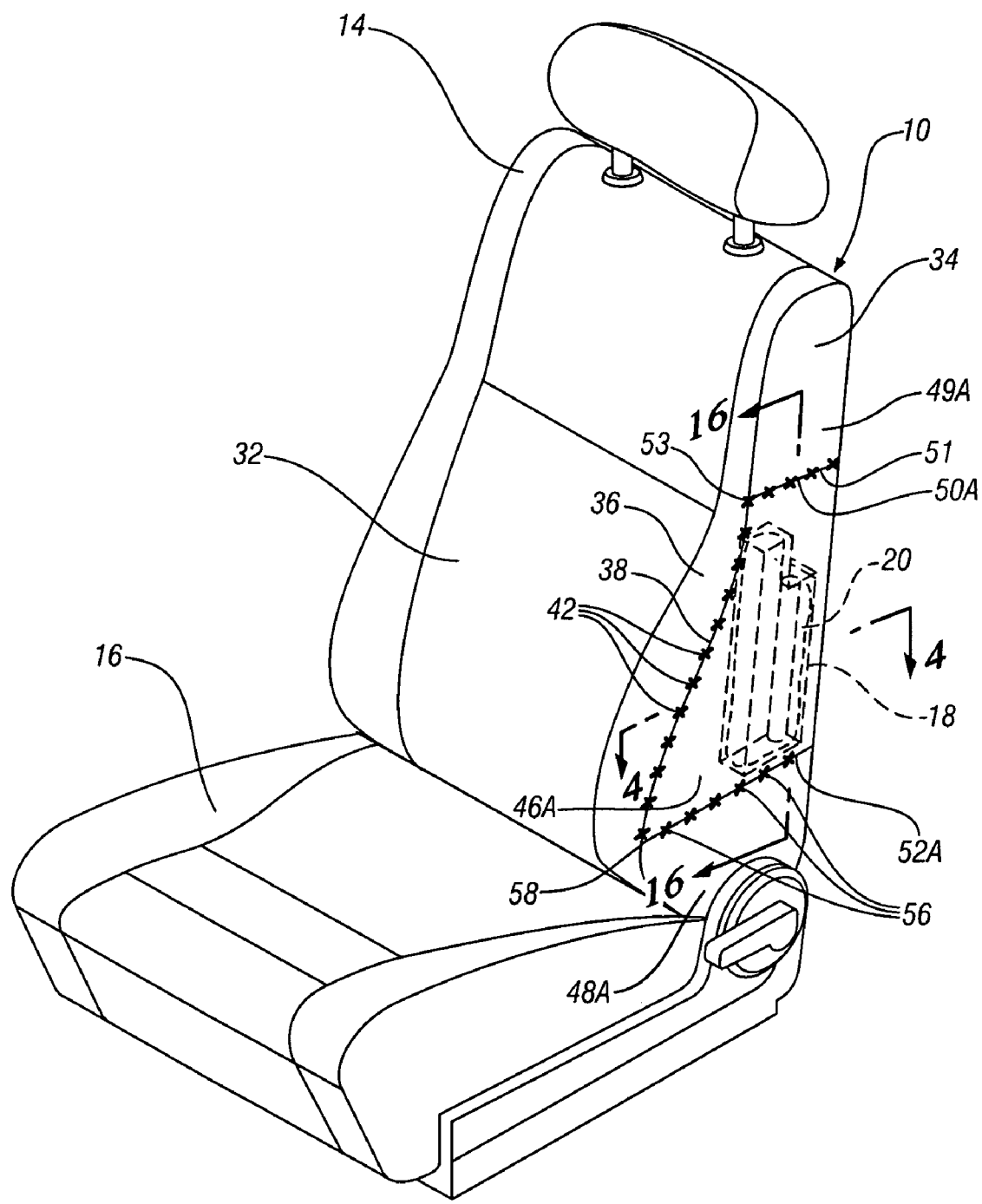
FIG. 15 is a perspective view similar to that of FIG. 1 and showing another embodiment of the invention.
Figure 16:
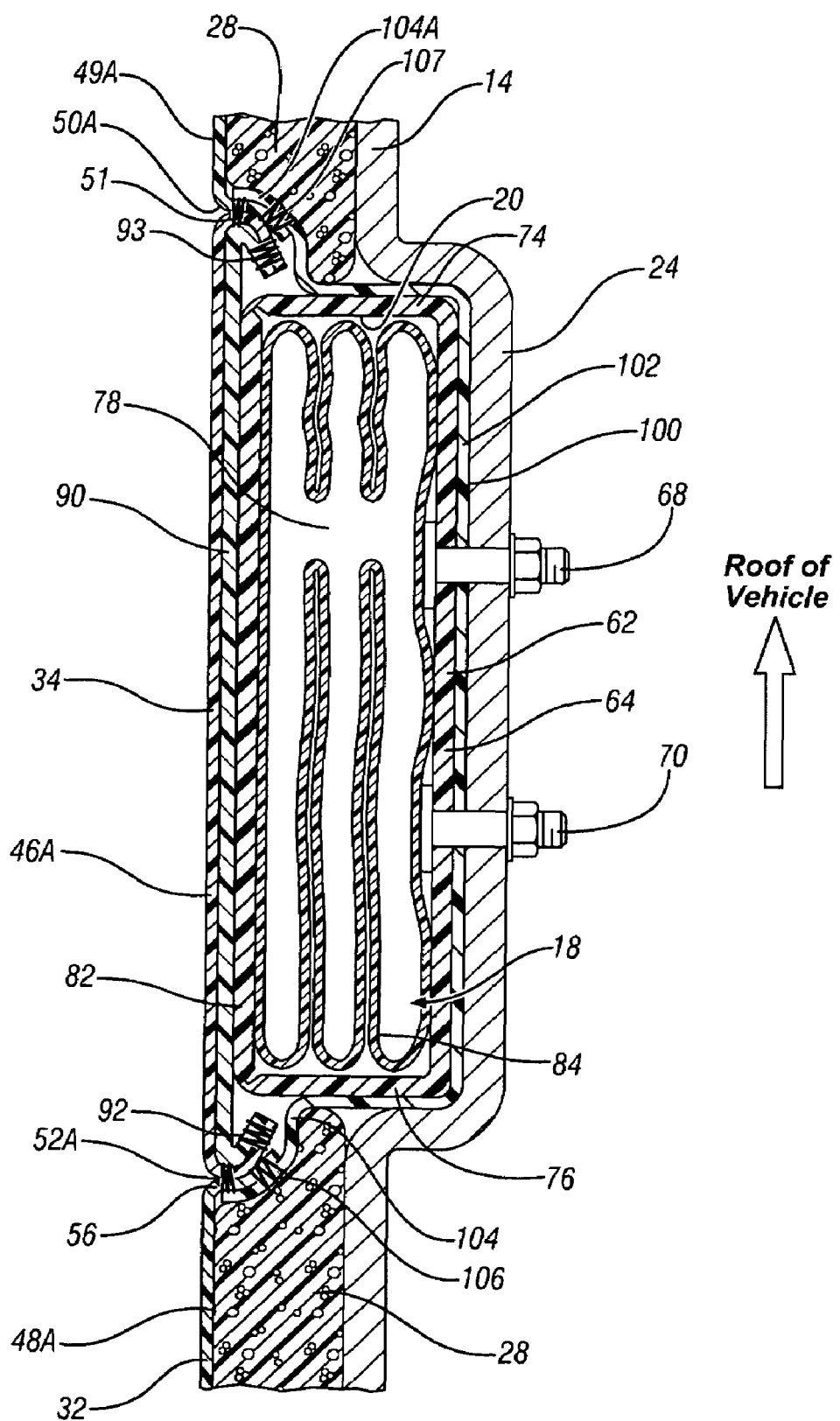
FIG. 16 is a section view taken in the direction of arrows 16-16 of FIG. 15.

FIGS. 15 and 16 show another embodiment of the invention. FIG. 15 has many elements in common with FIG. 1, and accordingly, like elements are identified by like reference numerals. FIG. 16 has many elements in common with FIG. 3, and accordingly, like elements are identified by like reference numerals. In addition, the view shown in FIG. 4 is also applicable to the embodiment of FIGS. 15 and 16 and will accordingly also be discussed in describing the embodiment of FIGS. 15 and 16.

Referring to FIGS. 15 and 16, a vehicle seat generally indicated at 10 includes a seat back 14 and a seat bottom 16. An air bag assembly, generally indicated at 18, is mounted within a hollow 20 in the seat back 14. As seen in FIG. 16 the seat back 14 includes a seat frame 24 of stamped metal construction. A foam seat cushion 28 covers the frame 24 and is suitably attached thereto. The foam cushion 28 is concealed beneath a seat trim cover 32, such as a woven cloth, vinyl, or leather.

As best seen in FIG. 4, the trim cover 32 includes a side panel 34 and a front panel 36. The side panel 34 and the front panel 36 are joined together at a vertical extending separable seam 38 that is formed by a series of breakaway stitches 42 that will be overcome upon inflation of the air bag as will be described hereinafter. Referring to FIGS. 15 and 16, the side panel 34 includes an intermediate portion 46A, a lower portion 48A, and an upper portion 49A.

The intermediate portion 46A and the lower portion 48A are joined together at a lower horizontal extending separable tear seam 52A provided by a series of breakaway stitches 56 that are provided between the lower edge of the intermediate portion 46A and the upper edge of the lower portion 48A. As seen in FIG. 15, the breakaway stitches 42 forming the vertical extending tear seam 38 and the breakaway stitches 56 forming the lower horizontal extending tear seam 52A intersect with one another at tear seam intersection 58.

Referring again to FIGS. 15 and 16, it is also seen that the intermediate portion 46A and the upper portion 49A are joined together by an upper horizontal extending separable tear seam 50A provided by a series of breakaway stitches 51 that are provided between the upper edge of the intermediate portion 46A and the lower edge of the upper portion 49A. The breakaway stitches 42 forming the vertical extending tear seam 38 and the breakaway stitches 51 forming the upper horizontal extending tear seam 49A intersect with one another at tear seam intersection 53. The breakaway stitches 56, 42, 51 may be continuous or discontinuous.

Thus, as seen in FIG. 15, the overall shape of the separable seams 38 and 52A and 49A is an C-shaped geometric arrangement adjacent the air bag assembly 18 on the outboard side of the seat back 14.

Referring to FIGS. 16 and 4, it is seen that the air bag assembly 18 includes an air bag housing 62 having a base wall 64 that is attached to the seat frame 24 by bolts 68 and 70. The housing 62 has side walls including upper side wall 74, lower side wall 76, front side wall 78 and rear side wall 80. The side walls 74, 76, 78 and 80 are connected by a breakaway cover 82 that conceals a folded up air bag 84 and an inflator 86. The air bag housing is conventionally constructed of plastic or fabric or a combination of plastic and fabric.

Referring to FIG. 16, it is seen that the side panel 34 of the seat cover is lined with an optional outer chute 90 that has a lower end sewed to the lower end of the intermediate portion 46A of side panel 34 by stitches at 92 and an upper end sewed to the upper end of the intermediate portion 46A of side panel 34 by stitches at 93. And, as seen in FIG. 4, the outer chute 90 also has a forward end which is sewn to the forward end of the side panel 34 adjacent to the separable seam 38 by stitches 96. A rearward end of the outer chute 90 reaches around to the back of the seat and is suitably anchored on the seat structure by fasteners, not shown. Alternatively, the outer chute 90 could wrap around the rearward side of the air bag housing 62 and run forward between the air bag housing 62 and the seat frame 24 and be anchored at this location by the bolts 68, 70 that attach the air bag housing 62 to the seat frame 24. The outer chute 90 is of a material that is less stretchable than the trim cover 32 material of the side panel 34 and has a smooth surface finish to allow the low friction passage of the air bag 84 there against.

FIGS. 16 and 4 also show an inner chute 100 that has a base portion 102 that is captured between the base wall 64 of the air bag housing 62 and the seat frame 24 to fixedly anchor the inner chute 100. As seen in FIG. 16, the inner chute 100 includes a lower edge portion 104 that extends downwardly and is sewn to the lower portion 48A of the side panel 34 by stitches at 106. FIG. 16 also shows that the inner chute 100 includes an upper edge portion 104A that extends upwardly and is sewn to the upper portion 49A of the side panel 34 by stitches at 107. FIG. 4 shows that the inner chute 100 extends forwardly between the foam cushion 28 and the side panel 34 all the way forward to the separable seam 38 where the forwardmost end 105 of the inner chute 100 is sewn to the front panel 36 of the seat cover by stitches 108. The inner chute 100 is made of a material that is less stretchable than the foam cushion 28 and offers a smooth low friction surface to allow the low friction passage of the air bag 84 there against.

Upon inflation of the air bag assembly 18, the air bag will inflate outwardly of the air bag housing 62 as permitted by break away of the breakaway cover 82. The lower horizontally extending separable seam 52A will break by the breaking of the stitches 56 to permit the air bag to deploy downwardly, the vertical extending separable seam 38 will separate via the breaking of the breakaway stitches 42 at the juncture between the side panel 34 and the front panel 36 to permit the air bag to deploy forwardly, and the upper horizontal extending seam 50A will separate by the breaking of the stitches 51 to allow the air bag to deploy upwardly.

Thus, in the embodiment of FIG. 15, It will be understood that during the inflation of the air bag 84, the outer chute 100 will function to prevent stretching of the side panel 34 so that the force of the air bag 84 acting upon the outer chute 90 will be transmitted effectively to the breakaway stitches 42, 56 and 51. Likewise, the inner chute 100 will function in a similar manner to effectively anchor and restrain the lower portion 48A and upper portion 49A of the side panel 34 as well as restrain front panel 36 so that the force generated by the inflating air bag 84 is effectively focused at the breakaway stitches 42 and 56 and 51.

Figure 17:
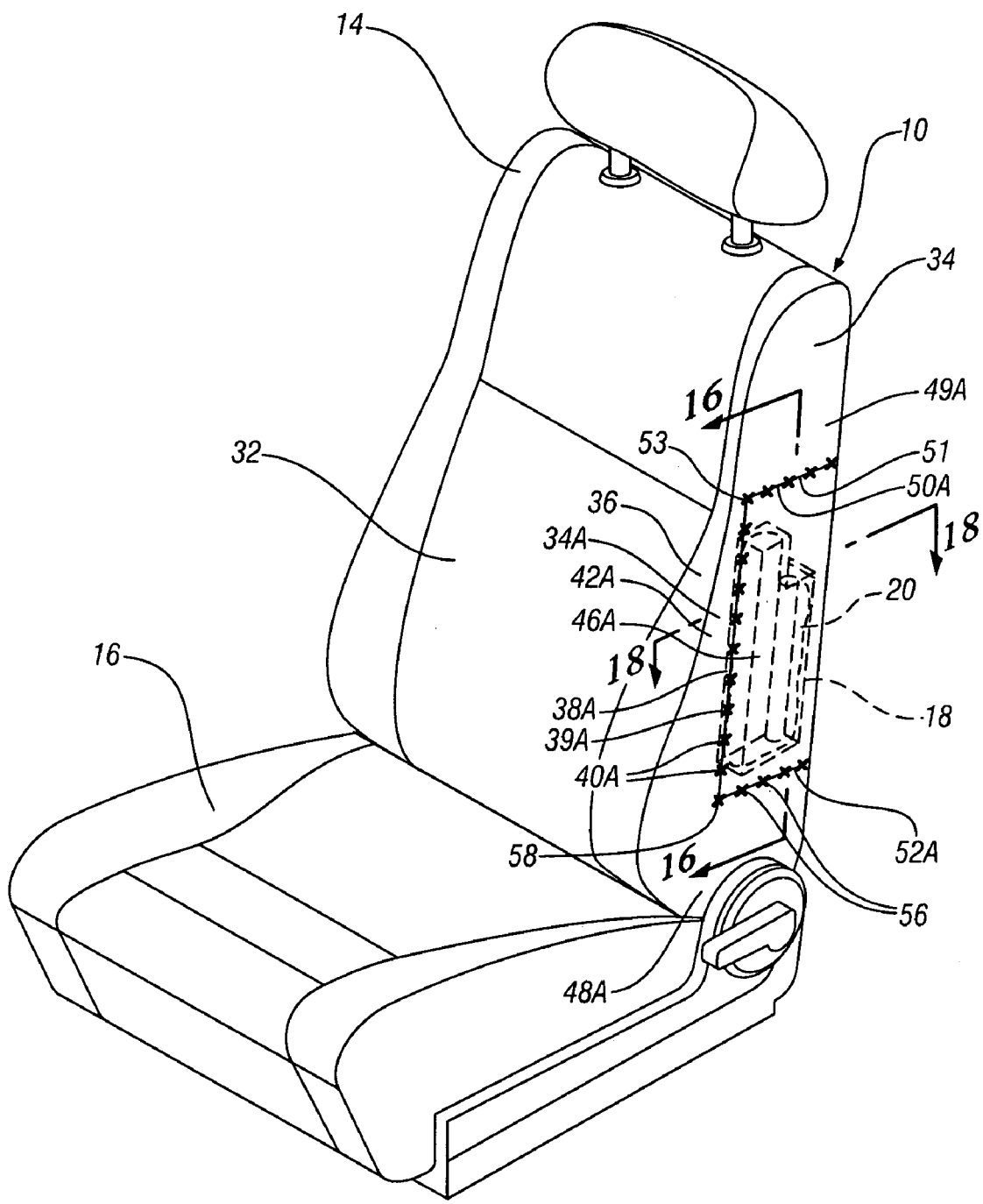
FIG. 17 is a perspective view similar to FIGS. 1 and 15 and showing yet another embodiment of the invention.
Figure 18:
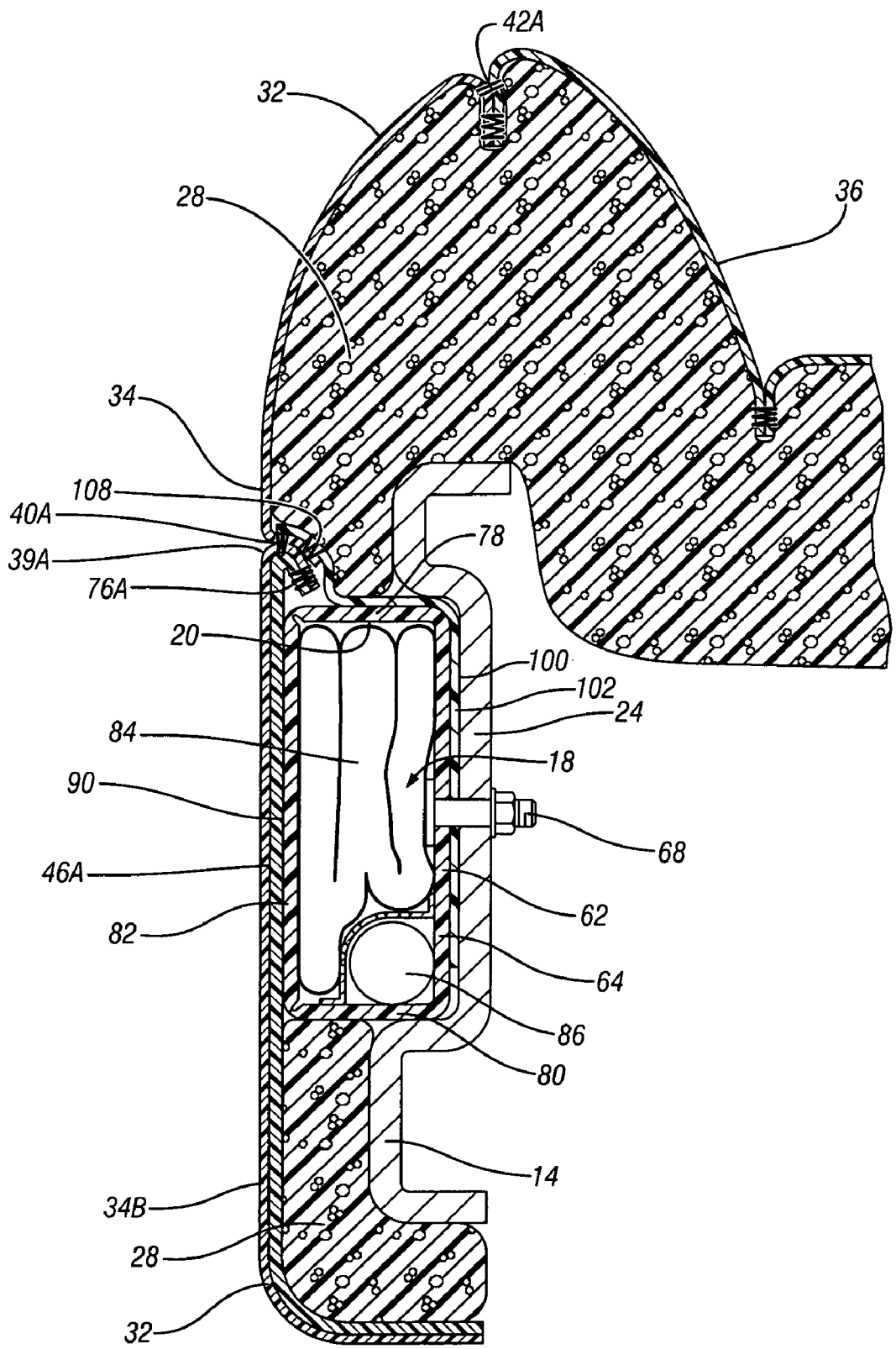
FIG. 18 is a section view taken in the direction of arrows 18-18 of FIG. 17.

FIGS. 17 and 18 show yet another embodiment of the invention. FIG. 17 has many elements in common with FIGS. 1 and 15, and, accordingly, like elements are identified by like reference numerals. FIG. 18 has many elements in common with FIG. 4, and accordingly, like elements are identified by like reference numerals. In addition, the view shown in FIG. 16 is also applicable to the embodiment of FIG. 17 and accordingly will also be discussed in describing the embodiment of FIG. 17.

Referring to FIGS. 17 and 16 and 18, a vehicle seat generally indicated at 10 includes a seat back 14 and a seat bottom 16. An air bag assembly, generally indicated at 18, is mounted within a hollow 20 in the seat back 14. As seen in FIG. 16 the seat back 14 includes a seat frame 24 of stamped metal construction. A foam seat cushion 28 covers the frame 24 and is suitably attached thereto. The foam cushion 28 is concealed beneath a seat trim cover 32, such as a woven cloth, vinyl, or leather.

As best seen in FIGS. 16 and 18, the trim cover 32 includes a side panel 34 and a front panel 36. The side panel 34 and the front panel 36 are joined together at a vertical extending seam 42A.

Referring to FIGS. 17 and 16, the side panel 34 includes an intermediate portion 46A, a lower portion 48A, and an upper portion 49A. A generally C-shaped tear seam 38A is provided in the side panel and includes a forward vertical extending separable tear seam 39A, provided by a series of breakaway stitches 40A, a lower horizontal extending separable tear seam 52A provided by a series of breakaway stitches 56 that are provided between the lower edge of the intermediate portion 46A and the upper edge of the lower portion 48A and intersect with the forward vertical extending separable tear seam 39A at intersection 58, and an upper horizontal extending tear seam 50A provided by breakaway stitches 51 that intersect with the forward vertical extending separable tear seam 39A at intersection 53. In this embodiment, as can be seen in FIG. 17, the upper portion 49A and the lower portion 48A of the side panel 34 are interconnected by a forward intermediate side panel portion 34A that is forward of vertical extending separable seam 39A.

Referring to FIG. 16, it is seen that the side panel 34 of the seat cover is lined with an optional outer chute 90 that has a lower end sewed to the lower end of the intermediate portion 46A of side panel 34 by stitches at 92 and an upper end sewed to the upper end of the intermediate portion 46A of side panel 34 by stitches at 93. And, as seen in FIG. 18, the outer chute 90 also has a forward end which is sewn to the forward end of the intermediate portion 46A of the side panel 34 adjacent to the separable seam 39A by stitches 76A. A rearward end of the outer chute 90 reaches around to the back of the seat and is suitably anchored on the seat structure by fasteners, not shown. Alternatively, the outer chute 90 could wrap around the rearward side of the air bag housing 62 and run forward between the air bag housing 62 and the seat frame 24 and be anchored at this location by the bolts 68, 70 that attach the air bag housing 62 to the seat frame 24. The outer chute 90 is of a material that is less stretchable than the trim cover 32 material of the side panel 34 and has a smooth surface finish to allow the low friction passage of the air bag 84 there against.

FIGS. 16 and 18 also show an inner chute 100 that has a base portion 102 that is captured between the base wall 64 of the air bag housing 62 and the seat frame 24 to fixedly anchor the inner chute 100. As seen in FIG. 16, the inner chute 100 includes a lower edge portion 104 that extends downwardly and is sewn to the lower portion 48A of the side panel 34 by stitches at 106. FIG. 16 also shows that the inner chute 100 includes an upper edge portion 104A that extends upwardly and is sewn to the upper portion 49A of the side panel 34 by stitches at 107. FIG. 18 shows that the inner chute 100 extends forwardly and is sewn to the side panel 34 by stitches 108 adjacent the forward vertical separable seam 39A. The inner chute 100 is made of a material that is less stretchable than the foam cushion 28 and offers a smooth low friction surface to allow the low friction passage of the air bag 84 there against.

Upon inflation of the air bag assembly 18, the air bag will inflate outwardly of the air bag housing 62 as permitted by break away of the breakaway cover 82. The C-shaped tear seam 38A will breakaway, including, in particular, the lower horizontally extending separable seam 52A will break by the breaking of the stitches 56 to permit the air bag to deploy downwardly, the forward vertical extending separable seam 39A will separate via the breaking of the breakaway stitches 40A to permit the air bag to deploy forwardly, and the upper horizontal extending seam 50A will separate by the breaking of the stitches 51 to allow the air bag to deploy upwardly. During the deployment, the inner chute 100 will anchor side panel 34 above, below and forward of the C-shaped separable tear seam 38A. The outer chute 100 will be tensioned by the opening of the cover 82 to tension the separable seams 52A, 39A and 50A. The separable seams 52A, 39A, and 50A may be continuous or discontinuous.

Thus in the embodiment of FIG. 17, It will be understood that during the inflation of the air bag 84, the outer chute 100 will function to prevent stretching of the side panel 34 so that the force of the air bag 84 acting upon the outer chute 90 will be transmitted effectively to the breakaway stitches 40A, 56 and 51. Likewise, the inner chute 100 will function in a similar manner to effectively anchor and restrain the lower portion 48A and upper portion 49A and rearward most side part 34B of the side panel 34 and the side panel portion 34A so that the force generated by the inflating air bag 84 is effectively focused at the breakaway stitches 40A, 56 and 51.

Referring again to FIGS. 19 and 20, another embodiment of the invention is shown in which the generally C-shaped tear seam of FIG. 17 has been supplemented by the addition of a rear vertical extending separable tear seam 60A that is provided in the intermediate portion 46A of the side panel 34 and intersects with the lower horizontal extending tear seam 52A and the upper horizontal separable tear seam 50A.

Figure 20:
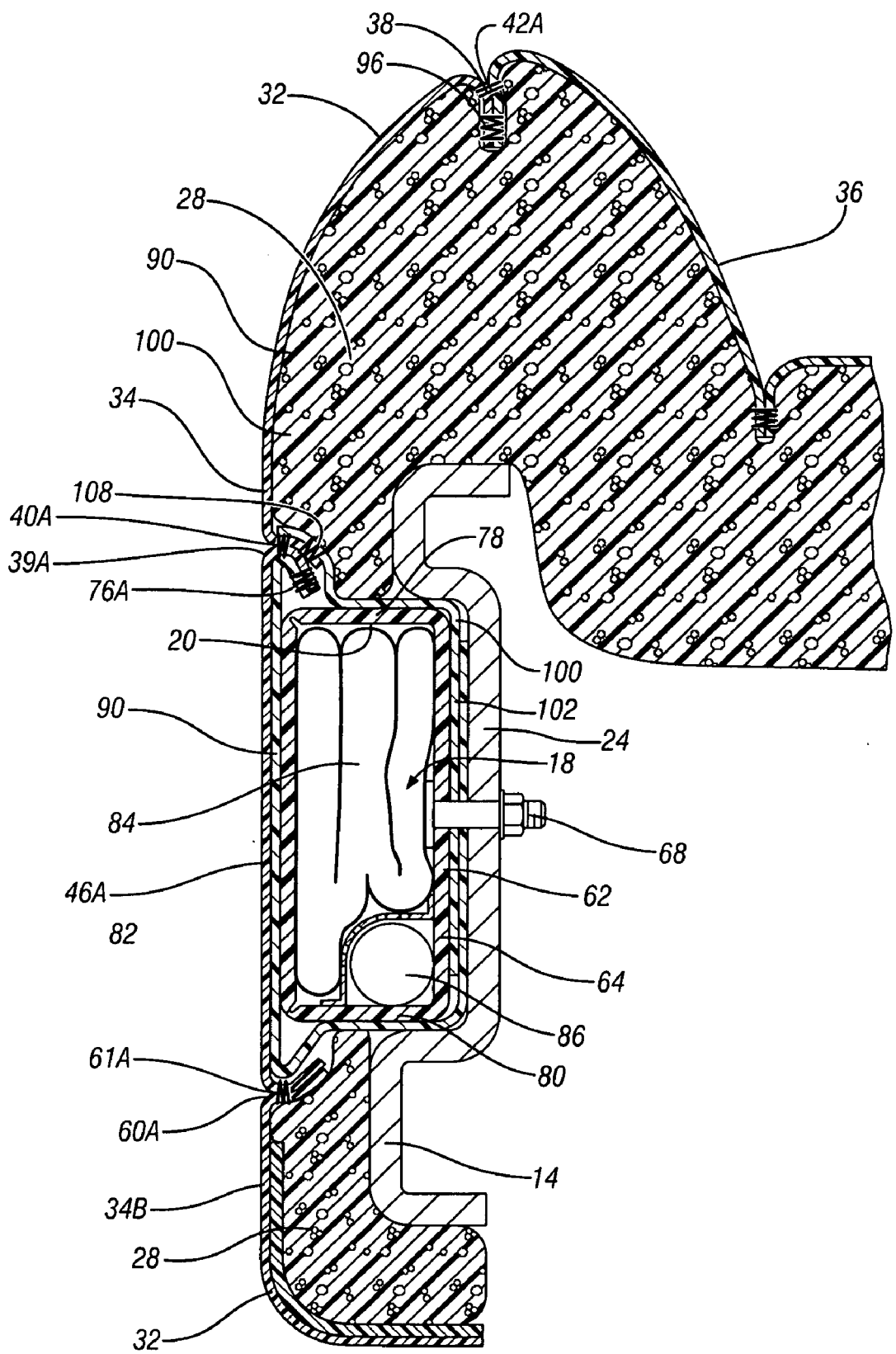
FIG. 20 is a section view taken in the direction of arrows 20-20 of FIG. 19.

As seen in FIG. 20, the rear vertical extending tear seam 60A is provided by stitches 61A that connect the intermediate portion 46A of the side panel 34 with a rearward most part 34B of the side panel 34. The inner chute 100 runs rearward underneath the air bag housing 62 and the seat frame 24 and is anchored at this location by the bolts 68, 70 that attach the air bag housing 62 to the seat frame 24. Likewise, the outer chute 90 wraps around the rearward side of the air bag housing 62 and runs forward between the air bag housing 62 and the seat frame 24 is anchored at this location by the bolts 68, 70 that attach the air bag housing 62 to the seat frame 24. Alternatively, the rearward end of the outer chute 90 could route inboard of tear seam 60A, reach around to the back of the seat, and be suitably anchored on the seat structure by fasteners, not shown. Also alternatively, the rear vertical extending tear seam 60a and stitches 61A could connect the intermediate portion 46A of the side panel 34 to the rear panel of the seat.

Figure 19:
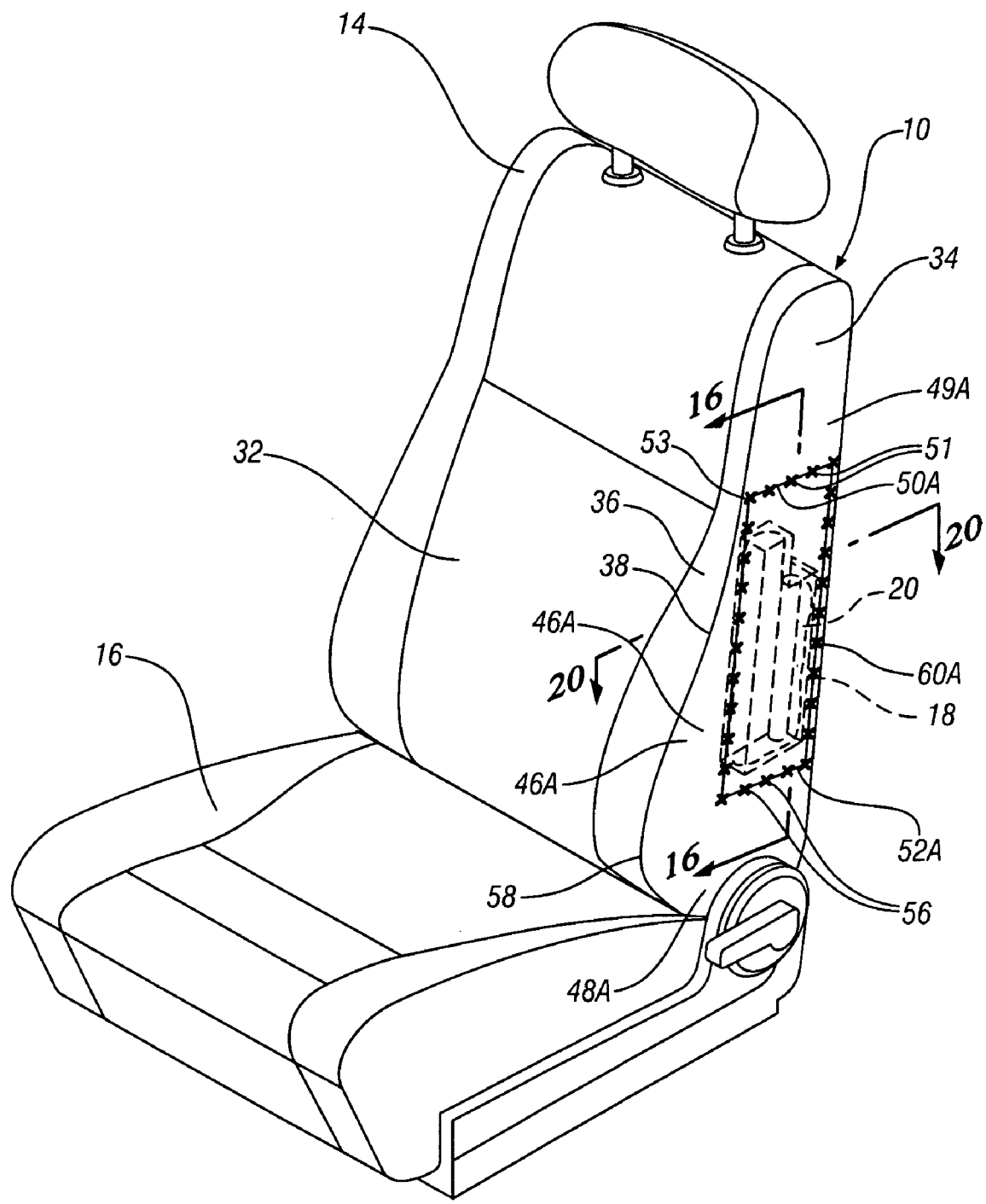
FIG. 19 is a perspective view similar to FIGS. 1 and 15 and 17 and showing yet another embodiment of the invention.

Thus as seen in FIG. 19, the overall shape of the separable seams 38, 52A, 49A and 60A is an O-shaped geometric arrangement adjacent the air bag assembly 18 on the outboard side of the seat back 14. The separable seams 38, 52A, 49A and 60A may be continuous or discontinuous.

Upon of the inflation of the air bag assembly 18, the air bag will inflate outwardly of the air bag housing 62 as permitted by break away of the breakaway cover 82. The lower horizontally extending separable seam 52A will break by the breaking of the stitches 56 to permit the air bag to deploy downwardly, the forward vertical extending separable seam 39A will separate via the breaking of the breakaway stitches 40A to permit the air bag to deploy forwardly, the upper horizontal extending seam 50A will separate by the breaking of the stitches 51 to allow the air bag to deploy upwardly, and the rear vertically extending tear seam 60A may separate via the breaking of stitches 61A to allow the air bag to deploy rearwardly.

Thus in the embodiment of FIG. 17, It will be understood that during the inflation of the air bag 84, the outer chute 100 will function to prevent stretching of the side panel 34 so that the force of the air bag 84 acting upon the outer chute 90 will be transmitted effectively to the breakaway stitches 40A and 56 and 51 and potentially 61A. Likewise, the inner chute 100 will function in a similar manner to effectively anchor and restrain the lower portion 48A and upper portion 49A and forward intermediate side panel portion 42A of the side panel 34 so that the force generated by the inflating air bag 84 is effectively focused at the breakaway stitches 40A and 56 and 51 and potentially 61A. In addition, the outer chute 100 acts as a tether to restraint the intermediate portion 46A of the side panel 34 which would otherwise be untethered due to the potential breaking of the breakaway stitches at 61A.

It will be understood that the invention is not limited to the particular attachment of the chute to the region around the separable seams. Although the drawings herein show the example of the separable tears seams being provided by a row of seams that are separate from the seams that attach the inner and outer chutes to the seat covering materials, it will be understood that a single row of stitches can be employed.

It will also be understood that the invention is not limited to the particular attachment of the air bag chute to the air bag housing that is shown in the examples of the drawings herein. Rather, the inner ends of the air bag chutes can be anchored on the seat trim or on the seat structure or on the air bag housing. For example, U.S. Ser. No. 12/335,726, filed 16 Dec. 2008, entitled "Air Bag Chute Attachment", shows several examples of air bag chute attachments that can be used in the present invention.

What is claimed is:

1. A vehicle seat with an air bag comprising:
   a seat back frame;
   a foam seat back cushion;
   an air bag assembly mounted upon the frame within a hollow in the cushion and having an inflatable air bag;
   a trim cover including a front panel and a side panel for covering the cushion and concealing the air bag assembly; said trim cover including a forward vertical extending separable seam located generally forward of the air bag assembly, an upper horizontal extending separable seam located generally above the air bag assembly and intersecting with the vertical extending separable seam, and a lower horizontal extending separable seam located generally below the air bag assembly and intersecting with the vertical extending separable seam;
   an inner chute panel that focuses the inflating air bag on the forward vertical extending separable seam, the upper horizontal extending separable seam and the lower horizontal extending separable seam so that upon inflation of the air bag assembly the inflating air bag forces the trim cover outwardly causing separation of the separable seams and enabling the air bag to inflate both forwardly through the forward vertical extending separable seam, and simultaneously to inflate downwardly through the lower horizontal extending separable seam and upwardly through the upper horizontal extending separable seam.

2. The vehicle seat with an air bag of claim 1 further comprising the forward vertical extending separable seam, the upper horizontal extending separable seam and the lower horizontal extending separable seam all being sewn seams that are sewn with separate threads.

3. The vehicle seat with an air bag of claim 1 further comprising said trim cover including the front panel being sewn to the side panel and the forward vertically extending separable seam being located at the juncture of the side panel and the front panel.

4. The vehicle seat with an air bag of claim 1 further comprising said trim cover including the front panel being sewn to the side panel and the forward vertically extending separable seam being located in the side panel.

5. The vehicle seat with an air bag of claim 1 further comprising the inner chute panel fixedly mounted inboard of the air bag assembly and having a forward end extending between the side panel and the cushion to the side panel forward of the vertical extending separable seam and being attached to the side panel forward of the vertical extending separable seam, an upper end extending to and being attached to the side panel generally above the air bag assembly, and a lower end extending to and being attached to the side panel generally below the air bag assembly to thereby focus the force of the inflating air bag at the separable seams to expedite the separation of the separable seams and the inflation of the air bag.

6. The vehicle seat with an air bag of claim 1 further comprising a rear vertically extending separable seam located generally rearward of the air bag assembly and extending between the lower horizontal extending separable seam and the upper horizontal extending separable seam to permit the air bag to deploy rearwardly.

7. The vehicle seat with an air bag of claim 1 further comprising the inner chute panel fixedly mounted inboard of the air bag assembly and having a forward end extending to the forward vertical extending separable seam located generally forward of the air bag assembly, an upper end extending to the upper horizontal extending separable seam located generally above the air bag assembly, and a lower end extending to the lower horizontal extending separable seam located generally below the air bag assembly to thereby focus the force of the inflating air bag at the separable seams to expedite the separation of the separable seams and the inflation of the air bag.

8. The vehicle seat with an air bag of claim 2 further comprising an outer chute panel having a portion fixedly mounted inboard the air bag assembly and having a forward end extending therefrom to the forward vertical extending separable seam located generally forward of the air bag assembly, an upper end extending to the upper horizontal extending separable seam located generally above the air bag assembly, and a lower end extending to the horizontal extending separable seam located generally below the air bag assembly to thereby assist the inner chute in focusing the force of the inflating air bag at the separable seams to expedite the separation of the separable seams and the inflation of the air bag.

9. The vehicle seat with an air bag of claim 8 further comprising one or both of the inner and outer chutes having the portion thereof fixedly mounted inboard the air bag assembly attached to the seat back frame or trim cover or air bag assembly.

10. The vehicle seat with an air bag of claim 8 further comprising bolts attaching the air bag assembly to the seat back frame and both of the inner and outer chutes having the portion thereof fixedly mounted inboard the air bag assembly attached via the bolts.

11. The vehicle seat with an air bag of claim 8 further comprising said outer chute having a rearward end of the outer chute also acting as a tether to restrain the trim cover upon separation of the separable seams.

12. The vehicle seat with an air bag of claim 8 where the inner chute is attached to the front panel directly at one of the separable seam or attached to the front panel adjacent to the separable seam.

13. The vehicle seat with an air bag of claim 7 where the inner chute is attached to the front panel directly at one of the separable seam or attached to the front panel adjacent to the separable seam.

14. The vehicle seat with an air bag of claim 1 further comprising the forward vertical extending separable seam, the upper horizontal extending separable seam and the lower horizontal extending separable seam all being seams that are sewn with thread and that the seams are sewn with a continuous threaded stitch.

15. A vehicle seat with an air bag comprising:
   a seat back frame;
   a foam seat back cushion;
   an air bag assembly mounted upon the frame within a hollow in the cushion and including an inflatable air bag;
   a trim cover for covering the cushion and concealing the air bag assembly; said trim cover including a forward vertical extending separable seam located generally forward of the air bag assembly, an upper horizontal extending separable seam located generally above the air bag assembly and intersecting with the vertical extending separable seam, a lower horizontal extending separable seam located generally below the air bag assembly and intersecting with the forward vertical extending separable seam, and a rearward vertical extending separable seam located generally rearward of the air bag assembly;

and an inner chute panel and an outer chute panel, said inner chute panel being mounted fixedly relative the air lag assembly and having ends extending to and attached to the trim cover at the forward vertical extending separable seam, upper horizontal extending separable seam, and lower horizontal extending separable seam on the side of the separable seams furthest from the air bag assembly, and the outer chute panel overlying the air bag assembly and having ends attached to the trim cover at the forward vertical separable seam on the side thereof closest to the air bag assembly and to the trim cover at the upper horizontal extending seam on the side thereof closest to the air bag assembly, and to the trim cover at the lower horizontal separable seam on the side thereof closest to the air bag assembly so that upon inflation of the air bag assembly the inflating air bag forces the trim cover outwardly causing separation of the separable seams and enabling the air bag to inflate both forwardly through the forward vertical extending separable seam, and simultaneously to inflate downwardly through the lower horizontal extending separable seam and upwardly through the upper horizontal extending separable seam.

16. The vehicle seat with an air bag of claim 15 further comprising a tether having a first end fixedly mounted relative to the air bag assembly and a second end attached to the trim cover at the rearward vertical extending separable seam on the side of the separable seam closest to the air bag assembly.

17. The vehicle seat with an air bag of claim 15 further comprising the air bag also rupturing the rearward vertical extending separable seam.

18. A vehicle seat with an air bag comprising:
a seat back frame;
a foam seat back cushion;
an air bag assembly mounted upon the frame within a hollow in the cushion and including an inflatable air bag;
a trim cover for covering the cushion and concealing the air bag assembly; said trim cover including a forward vertical extending separable seam located generally forward of the air bag assembly, an upper horizontal extending separable seam located generally above the air bag assembly and intersecting with the vertical extending separable seam, and a lower horizontal extending separable seam located generally below the air bag assembly and intersecting with the vertical extending separable seam;
an inner chute panel and an outer chute panel, said inner chute panel being mounted fixedly relative to the air bag assembly and having ends extending to and attached to the trim cover on the side of the separable seams furthest from the air bag assembly, and the outer chute panel overlying the air bag assembly cover and having ends attached to the trim cover on the side of the separable seams closest to the air bag assembly, so that upon inflation of the air bag assembly the inflating air bag forces the trim cover outwardly causing separation of the separable seams and enabling the air bag to inflate both forwardly through the forward vertical extending separable seam, and simultaneously to inflate downwardly through the lower horizontal extending separable seam and upwardly through the upper horizontal extending separable seam.

19. The vehicle seat with an air bag of claim 18 further comprising said trim cover including a front panel that is sewn to a side panel and the forward vertically extending separable seam being located at the juncture of the side panel and the front panel.

20. The vehicle seat with an air bag of claim 18 further comprising said trim cover including a front panel that is sewn to the side panel and the forward vertically extending separable seam being located in the side panel.

* * * * *